United States Patent [19]

Hed

[11] Patent Number: 5,222,795
[45] Date of Patent: Jun. 29, 1993

[54] CONTROLLED LIGHT EXTRACTION FROM LIGHT GUIDES AND FIBERS

[75] Inventor: Aharon Z. Hed, Nashua, N.H.

[73] Assignee: Light Sciences, Inc., Braintree, Mass.

[21] Appl. No.: 813,972

[22] Filed: Dec. 26, 1991

[51] Int. Cl.⁵ .............................................. F21V 7/04
[52] U.S. Cl. ........................................ 362/32; 362/31
[58] Field of Search .............................. 362/31, 32, 26

[56] References Cited

U.S. PATENT DOCUMENTS

| | | |
|---|---|---|
| 4,422,179 | 12/1983 | Orcutt et al. . |
| 4,460,930 | 7/1984 | Mori . |
| 4,471,412 | 9/1984 | Mori . |
| 4,765,701 | 8/1988 | Chesiak . |
| 4,779,166 | 10/1988 | Tanaka et al. .................. 362/32 X |
| 4,822,123 | 4/1989 | Mori . |
| 4,961,617 | 10/1990 | Shuhidi et al. . |
| 5,036,435 | 7/1991 | Tokuda et al. .................. 362/32 X |

*Primary Examiner*—Allen M. Ostrager
*Attorney, Agent, or Firm*—Herbert Dubno

[57] ABSTRACT

A controlled emission of light from an optical waveguide, e.g. a fiber into which light is injected at one end, is effected by modifying the periphery of the waveguide over a generally triangular zone so that there is a controlled emission per unit length at every point along this zone and light emanates continuously over the length of the zone from the fiber.

20 Claims, 4 Drawing Sheets

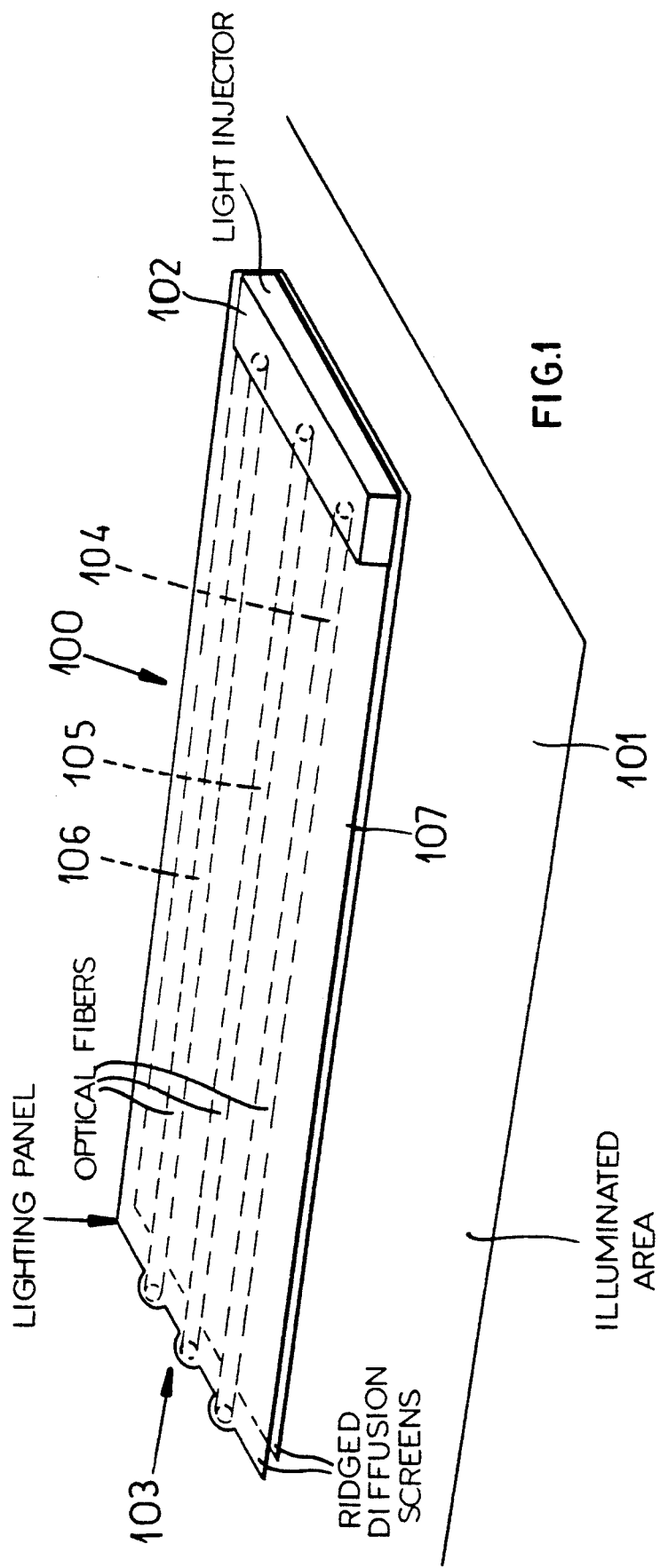

CONTROLLED LIGHT EXTRACTION FROM LIGHT GUIDES AND FIBERS

FIELD OF THE INVENTION

My present invention relates to the controlled light extraction from light guides, fibers and, more generally, waveguides for the wavelengths of light and, more particularly, to a method of illuminating an area in a controlled manner, to means for illuminating an area and to light waveguides structured to emanate light continuously over a length thereof at a predeterminable or predetermined light output per unit length of the waveguide.

BACKGROUND OF THE INVENTION

Optical fibers, a special case of optical waveguides, have found a large number of applications in transferring at low losses electromagnetic waves and particularly visible and infrared light over long distances. Such uses are common in fields as varied as telecommunication and laser surgery. In most of these cases the design goals for the optical fibers is to minimize optical losses of the carried beam through the optical fiber, and thus the materials used are usually glasses with minimal optical losses. When short distances are contemplated, polymers having higher optical losses are often used.

Optical fibers and waveguides are usually classified into single-mode fibers (SMF) and multimode fibers (MMF). The former support a single mode of light propagation while, in the latter, a broad spectrum of modes and wavelengths propagation can occur. Traditional optical fibers consist of a core and a cladding with respective indices of refraction $n_1$ and $n_2$. In order to assure complete internal reflection of the transmitted light within a fiber or a waveguide, the index of refraction of the cladding is always smaller than that of the core. This assures that all light within the acceptance angle of the fiber is internally reflected at the core/cladding interface, see *Handbook of Fiber Optics-theory and Applications*, by Chai Yeh, published by Academic Press, San Diego, CA, 1990.

Numerous applications of optical fibers bundles to illumination are known. In most cases the fiber bundle is simply used to conduct the light to the remote location and the light is emitted from the open end of these fibers. In some instances, it is desirable to conduct electromagnetic waves along a single guide and extract light along a given length of the guide's distal end rather than only at the guide's terminating face. This special need has been recognized in the prior art and numerous approaches to the extraction of light at intervals from optical waveguides or optical fibers have been proposed. Each of these proposals, however, has its specific shortcomings making the application impractical or limited to only few situations.

For instance, Orcutt in U.S. Pat. No. 4,422,719, proposes the extraction of light from a light guide by enclosing the waveguide within a transparent sleeve having an index of refraction greater than the index of refraction of the waveguide and embedding within the sleeve light-reflecting powders, or by providing other discontinuities such as cuts or air bubbles within the fiber core. This approach has a number of shortcomings. First, the light extraction rate along the guide declines monotonically (and quite rapidly) from the proximal end to the distal end. The higher index of refraction of the cladding causes conversion of core modes (light propagation mode) to cladding modes to occur at the proximal end or the composite guide, thus sharply depleting the beam intensity as the light traverses the full length of the guide. Furthermore, the use of particles and bubbles suspended within the cladding causes excessive absorption of the light in the transmitting medium (particularly the cladding itself). Orcutt attempts to overcome the lack of light extraction control by including in the core refracting discontinuities or "light extraction" cuts through the cladding to the core and spacing these as a function of the distance from the light source. This approach is difficult to implement and furthermore, creates a series of discrete light sources along the guide and does not allow for continuous light extraction.

Mori (U.S. Pat. Nos. 4,460,940, 4,471,412 and 4,822,123) uses discrete light diffusing elements on a light transmission element to extract light from said light guide. In U.S. Pat. No. 4,460,940, Mori uses convex or concave diffussing elements to extract light of a specific wavelength, and a set of discrete elements with increasing density (but constant thickness) toward the distal end of the transmitting medium to extract light (presumably all wavelengths) from the transmitting element.

In U.S. Pat. Nos. 4,471,412 and 4,822,123, Mori uses discrete light outlets on a light conducting member. In the former patent he uses discrete diffusing elements without consideration to their quantitative light extraction capabilities while in U.S. Pat. No. 4,822,123 he uses light scattering discrete elements and simply increases their number as he approaches the distal end of the light conductor. The disadvantages of Mori's light extraction systems include discontinuity of the light sources in that the appearance of the device includes a plurality of concentrated light sources, and the great difficulty in correctly spacing and sizing the extraction elements to provide for controlled light extraction from the light guide. Furthermore, the manufacturing and assembly of the devices of Mori is awkward and costly.

Cheslak U.S. Pat. No. 4,765,701 also uses discrete elements to extract light from an optical fiber in conjunction with a panel. Cheslak uses angular recesses and does not provide for means to control quantitatively the light extraction, and as a result, the illumination from the downstream (distal) recesses is progressively lower.

The prior art as described is thus wanting in the areas of controlled light extraction from optical fibers and waveguides and to the extent that a minimal control is gained, the prior art provides light output that occurs in discrete segments rather than in a continuous manner. Furthermore, some of the prior art fails to provide for completion of light extraction along the transmitting medium, leaving an undetermined portion of the light transmitted through the waveguide to be emitted, presumably at the distal end of the guide.

OBJECTS OF THE INVENTION

The principal object of the invention is to provide a method of and means for illuminating an area in a controlled manner so that drawbacks of earlier illuminating systems using light waveguides are avoided.

Another object is to provide waveguides and optical fibers from which light can be extracted in a continuous manner by the refraction or by the diffused reflection of a controlled proportion of the light traversing the optical transmitting medium.

It is a further object of the instant invention to provide a method to efficiently extract light in a continuous and at a predetermined rate from optical fibers and other light guides.

It is yet another object of the instant invention to provide linear light sources having a predetermined relative luminosity along their length.

It is still another object of the instant invention to provide such light sources where the luminosity along their length can be constant.

It is a particularly important object of the instant invention to provide such light extraction systems from which substantially all the light entering the extractor's proximal end is extracted along the extractor's extraction zone.

A further object of the instant invention is to provide a light extractor from which a predetermined residual portion of the light entering the proximal end of the extraction zone is allowed to be emitted at the extractor distal end while the balance of the light is extracted along the extraction zone.

SUMMARY OF THE INVENTION

These objects and others which will become apparent hereinafter are attained, in accordance with the present invention in a method of illuminating an area which comprises the steps of:

(a) providing at least one elongated light waveguide having a periphery so structured with respect to a core thereof as to enable the core to transmit light along the length of the waveguide while the periphery prevents emanation of light from the core in a direction transverse to the waveguide.

(b) modifying a portion of the periphery over an extraction zone L of the waveguide to impart a generally triangular shape to the zone extending continuously from a narrow end to a wide end thereof and so that light travelling through the core in a propagation direction form the narrow end to the wide end will emanate in an emanation direction transversely to the propagation direction, the zone narrowing in width in a spreading direction transversely to the propagation direction and to the emanation direction whereby an area exposed to the light emanating from the waveguide is illuminated continuously along the length of the zone; and (c) injecting light into the waveguide ahead of said narrow end so that the light propagates in said propagation direction whereby the area is illuminated.

Thus I extract light in an extraction zone of the waveguide in a controlled manner by treating a portion of the waveguide periphery in the extraction zone so as to convert a portion of the core modes (or transmitted modes) to a leaky mode (or emitted modes), along the extraction zone of the waveguide.

The extraction zone having a width whose proportion of the total periphery is t(z), where z is the distance along the extraction zone as measured from the beginning of the extraction zone in the propagation direction, where t(z) substantially satisfy the relationship:

$$t(z) = \frac{J(z)}{K - C \int_0^z J(z)dz} \quad (1)$$

and where J(z) is the desired light extraction rate per unit length in the extraction zone and K and C are integration constants determined by the geometry of the waveguide and the desired total portion of the transmitted light to be extracted along the extraction zone.

According to the invention, the waveguide can be an optical fiber and the core is cylindrical, the light-extraction zone having a width in the spreading direction subtended by an angle $\theta(z) \approx t(z)$.

The periphery can be formed by a cladding of the light fiber where the cladding has an index of refraction that is less than an index of refraction of the core and the periphery can be modified by removing the cladding over the light-extraction zone. A surface of the core exposed over the light-extraction zone can be rendered diffusively light emissive by abrading the surface, coating the surface or chemically treating the surface. Alternatively, I can substitute for the cladding in this light-extraction zone a cladding with an index of refraction which is greater than the index of refraction of the core.

In another alternative, the periphery is modified by modifying the index of refraction of the cladding along the zone or by applying a reflective coating over the exposed core in the light extraction zone to direct light through the core from the reflective coating.

The aforementioned objects are thus attained by converting in a controlled fashion transmitted light modes to leaky light modes which emanate from the fiber. Specifically, the core of an optical fiber along an extraction length of the fiber can be exposed and the width of the exposed core is controlled as a function of the position, to predetermine the proportion of light extracted at this position.

Furthermore, in some embodiments, the exposed core surface is treated to cause the light impinging on the exposed core to be refracted into angles greater than the core critical angle. In other embodiments of the instant invention, the light is lambertially reflected into angles greater than the core's critical angle to achieve the same goal.

I have found, moreover, that it is possible to derive the exact core exposure geometry required for a desired extraction rate along the fiber, while assuring that substantially all light entering the extraction zone is extracted along the zone. Similarly, in some embodiments of the instant invention, similar principles are practiced by the judicious use of claddings having a progressivley higher index of refraction from the proximal end of the extraction zone to its distal end.

BRIEF DESCRIPTION OF THE DRAWING

The above and other objects, features and advantages of the present invention will become more readily apparent from the following description, reference being made to the accompanying drawing in which:

FIG. 1 is a diagrammatic perspective view illustrating an apparatus for illuminating an area according to this invention utilizing a plurality of fibers or light waveguides, treated along their lengths so as to be light emissive in a controlled manner;

SPECIFIC DESCRIPTION

Figures 1A, 1B, 1C:
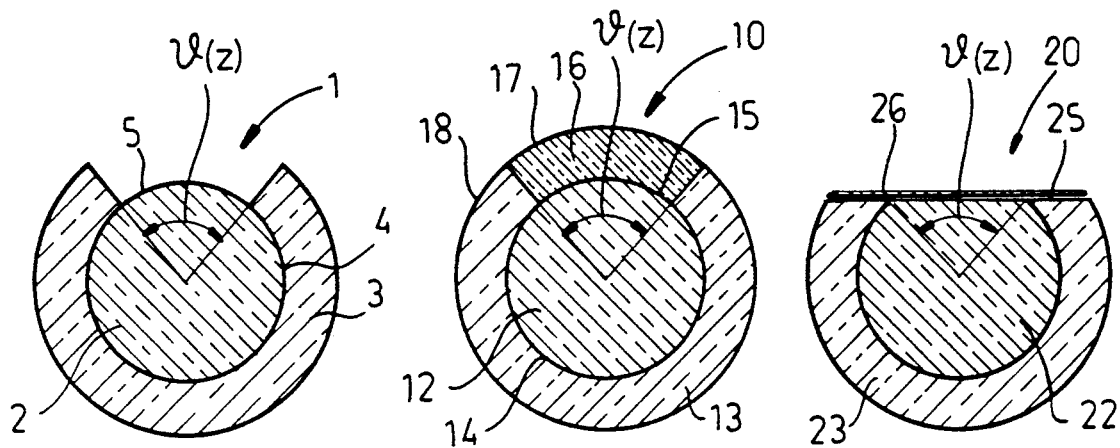
FIGS. 1A-1E are cross sectional views taken along lines 1—1, 2—2, 3—3 and 4—4 with respect FIGS. 1A-1D of FIGS. 2A-2D, through various embodiments of light waveguides in the form of optical fibers showing different treatments for the zone of the periphery defining the controlled emanation of light from the fiber in the region of the cross section.

Referring to FIG. 1 and prior to a description of the principles of the invention in greater detail and how the treatment of the light-emitting fibers correlates with the principle of the invention, it can be seen that a lighting panel 100 intended to illuminate an area 101, can comprise a light source 102 in the form of a light injector for optical fibers utilizing one or more semiconductor lasers, LEDS, incandescent, glow or fluorescent lamps, and an array 103 of optical fibers 104, 105, 106 into an end of which light is injected. The optical fibers 104–106 can have the constructions diagrammatically illustrated in the remaining Figures as discussed in greater detail below.

Suffice it to say at this point, that the light is emanated downwardly and impinges on the area 101 through two rigid diffusion screens 106 and 107 forming a combined diffuser of the type described in my commonly assigned copending application Ser. No. 07/788,184 filed Nov. 5, 1991.

If one considers a cylindrical multimode optical fiber consisting of a core having an index of refraction $n_1$ and a cladding having an index of refraction $n_2$, obeying the relationship $n_1 > n_2$. Light rays entering this fiber can be divided into transmitted modes and leaky modes. The transmitted mode undergoes complete internal reflection at the core/cladding interface and are characterized by the fact that the ray angles relative to the fiber axis are smaller than a critical angle $\alpha_c$, given by the relationship:

$$n_1 \cos \alpha_c = n_2 \quad (2)$$

The leaky modes propagate in the fiber at an angle larger than the critical angle $\alpha_c$, and as a result are refracted out of the fiber at their first incidence on the core/cladding interface. It is clear that after light has propagated in the fiber a short distance d ($d = 2rn_1 \cos\alpha_c$, where r is the core radius) from the entry end of the fiber into the fiber, the light within the fiber will all be in the transmitted mode. In practical applications it is often desired to have as much of the light source's flux entering the fiber within an angle of acceptance, $\alpha_{co}$, related to the numerical aperture NA of the fiber:

$$NA = n_0 \sin\alpha_{co} = (n_1^2 - n_2^2)^{\frac{1}{2}} \quad (3)$$

This equation assumes that light enters the fiber from air when the index of refraction is 1.

The essence of the instant invention is the controlled and continuous conversion of transmitted modes propagating within the optical fibers to leaky modes which are extracted from the fiber at a predetermined and predeterminable rate. Let $I_o$ be the flux of transmitted mode light entering the fiber at its proximal end. This flux can be divided into two portions, a very small portion of the light rays enters the fiber axially while the majority of the light enters the fiber in an off-axis manner. Under optimal conditions (perfect roundess of the core, absence of irregularities in the core and at the core/cladding interface and a fiber devoid of curves), the former rays will undergo numerous internal reflections within the fiber but will travel in their original plane of incidence. All off-axis rays, however, and thus the greatest part of $I_o$ will travel in a helical fashion down the fiber.

Let us now consider the length of fiber L, starting at the first point on the fiber where light is to be extracted and ending at the fiber distal end, and let z be the coordinate along this segment's axis (namely $z=0$ at the beginning of the light extraction zone and $z=L$ at the distal end which is also the end of the extraction zone) with the light traveling generally in the direction of increasing z. The point $z=0$ can be close to the light source or the light can be transmitted to that location from an appreciable distance. Let $I_z$ be the light flux at any point within the fiber (across a plane perpendicular to the fiber axis) and let $J_z$ be the light extracted per unit length of the fiber at this point z. If it is assumed that all optical losses mechanisms (light absorption in the fiber and the cladding) are negligible, then the following relationship along the light extraction zone holds:

$$\frac{dI_z}{dz} = -J_z \quad (4)$$

This, relation applied, in an ideal case, because the rate of change per unit length of the light flux within the fiber is the light extracted from the same unit length. In general, if $J_z$ is a function f(z) of the position z, the light flux within the fiber at any position z will be given by:

$$I_z = I_0 - \int_0^z f(z)dz \quad (5)$$

As an illustration let us consider a specific case of equations (4) and (5), when the extracted light flux per unit length ($j_z$) is to be constant along the zone of extraction, or $f(z) = $ Constant, and let us also require that all the light be extracted along the fiber's extraction zone. Rearrangement and integration of equation 3, with the boundary conditions: $I_{z=0} = I_0$, and $I_{z=L} = 0$, yields the light flux within the fiber as function of the position z:

$$I_z = I_0\left(1 - \frac{z}{L}\right) \quad (6)$$

As has been mentioned previously, the method of extracting light from the fiber involves the conversion of transmitted modes to leaky modes. I can achieve the conversion of a controlled portion of the light at a given location z on the fiber from the transmitted to the leaky modes by two major mechanisms. The first involves diffusing a controlled portion of the light which is internally reflected in the fiber at z into angles larger than the critical angle $\alpha_c$ of the fiber, the second involves changing the effective critical angle of the fiber as a function of the position z on the fiber.

Diffusion of light from the core in an optical fiber or a waveguide into angles larger than $\alpha_c$ can be achieved in two main fashions. In the first, termed the "refractive method," the core of the fiber is exposed on the side from which most of the extracted light emanates; the core surface is treated so as to convert transmitted modes to leaky modes.

By controlling the geometry of the treated area, I can obtain the desired rate of light extraction. The treatment itself can be slight abrasion of the surface to render it uneven, or the replacement of the cladding in the treated area with a material having an index of refraction larger than the index of refraction of the core.

The second method, termed the "reflective method," involves removing the cladding from the side opposing the side from which light need be extracted and replacing it with a diffuse or a lambertian reflector, and here too, controlling the geometry of the treated area is the key to obtaining the desired rate of light extraction.

FIG. 1A is a cross section through an optical fiber 1, at a point z within the extraction zone of the fiber, having a core 2 with an index of refraction $n_1$, and a cladding 3, with an index of refraction $n_2$ which obeys the relationship $n_1 > n_2$. As indicated in equation 2, all the light travels within the fiber at angles to the fiber's axis which are smaller than the critical angle $\alpha_c$ of the fiber. If z is far enough from the light source, it can be assumed that the light impinging the core/cladding boundary 4 is circumferentially distributed homogeneously and is proportional to the flux $I_z$ through the cross section at z, this since the majority of the flux is propagating in a helical fashion through the fiber. This assumption is not accurate near the light's entry point to the fiber, but is a sufficiently good approximation in the extraction zone to determine the proportion of the core circumference that need be treated to extract light a a predetermined rate.

If at a point z a segment 5 of the core 2 spanned by the angle $\theta(z)$ is treated as described, then the conversion rate from transmitted modes to leaky modes at a point z is proportional to the product of $I_z$ and $\theta(z)$ namely, the extraction rate per unit length $J_z$ at z can be given by:

$$J_z = AI_z\theta(Z) \quad (7)$$

where A is a constant with the dimension cm$^{-1}$ radian$^{-1}$, which can be determined in each case by boundary conditions and the specific properties of the fiber and the mechanism used to convert transmitted modes to leaky modes. It should be understood that for equation (7) to hold, it is not necessary that all the light impinging on the treated zone spanned by the angle $\theta(z)$ be extracted at z. For instance, when using the simple cladding (and exposed core) with abrasion as the extraction mechanism, a small portion of the light impinging on the treated zone will be reflected back into the fiber at angles smaller than $\alpha_c$ and thus still be in the transmitted mode. Another portion is reflected back into the fiber at angles larger than $\alpha_c$ and thus be in the leaky modes and be extracted around z on their first impingement at the core/cladding interface.

A small proportion is even reflected back to the light source and is in essence lost. These processes are all accounted for in equation (7) in the constant A which describes the partition of the light impinging on the treated zone to these different mechanisms. Below I will further elaborate on parameters affecting choice of the treatment chosen for specific applications.

The design of an actual extraction system of the instant invention is thus reduced to solving the differential equation obtained by combining equations (4) and (7), namely:

$$\frac{dI_z}{dz} + AI_z\theta(z) = 0 \quad (8)$$

for $\theta(z)$, when $I_z$ is given in equation (5) for a preselected rate of extraction $J_z = f(z)$. When we desire to extract light from the fiber at a constant rate, namely $J_z = \text{Constant} = I_0/L$, the angle of decladding $\theta(z)$ changes with the position z in a hyperbolic fashion or proportional to $(L-z)^{-1}$. In practice, we remove the singularity at $L=z$, by setting boundary conditions $\theta_{z=0} = 0$, and $\theta_{z=L} = \pi$.

A general solution is for the differential equation (8) yielding the decladding rate $\theta(z)=$ $$\frac{J(z)}{K - C \int_0^z J(z)dz}$$

were K and C are constants as described.

Another simple example is when the treated zone is a constant portion of the periphery, then the solution to equation 8 with $\theta(z) = \text{Const}$ is a declining exponential function of z, and thus $J_z$ will decline exponentially with the distance z. In the prior art (for instance U.S. Pat. Nos. 4,422,719 and 4,560,940), many of the light extraction systems are characterized by the fact that light emission from the light extractor declines exponentially toward the distal end of the light extractor system.

The method of using equation (8) to determine the best geometry to obtain a desired extraction rate along a light transmitting medium, taught in the instant invention, allows or the design of efficient extractors.

The most important light extractors are those where the light is extracted at a constant rate, for which we developed the general form of $\theta(z)$ above. When other extraction as are desired, equation (8) will usually be a nonlinear differential equation with a general solution given in equation (1). Let us consider now some specific embodiments of the instant invention in which light is extracted homogeneously along the extraction zone.

Figure 2A:
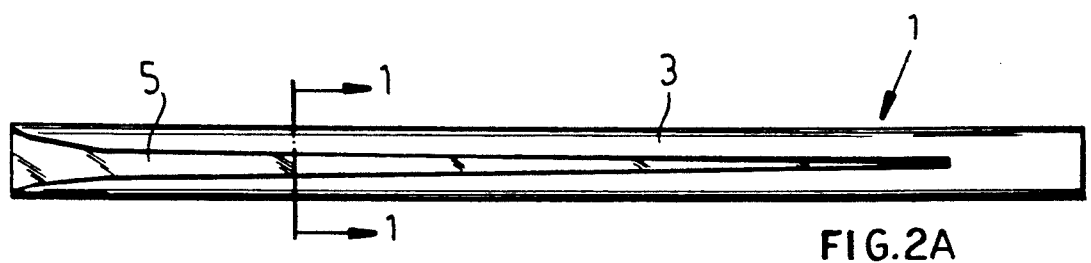
FIGS. 2A-2E are plan views of the optical fibers of a plurality of embodiments including the embodiments pertinent to FIGS. 1A-1E.
Figure 3A:
FIGS. 3A-3F are side elevational views in diagrammatic form of various embodiments of the light-emitting fibers of the invention.

FIG. 1A shows a cross section at a point z in the extraction zone through a fiber 1 (see also FIGS. 2A and 3A). A segment 5 of the core is exposed, the segment spanning an angle $\theta(z)$ which increases hyperbolically as described above from the proximal end to the distal end, thus creating an exposed core shaped like a triangle with concave (hyperbolic) sides and a base at the distal end which is half the core's circumference, or as stated above, $\theta(L) = \pi$. The surface of the exposed core however, must be roughened so as to expose the impinging beams inside the core to angles larger than the critical angle $\beta_c$. It can be shown that $\beta_c = 90° - \alpha_{co}$, where $\alpha_{co}$ is the angle of acceptance of the fiber as given by equation (3), which itself is larger than $\alpha_c$ of the fiber. This can be achieved by simply abrading the surface or otherwise treating it to render it nonspecular, or diffuse. For instance, the surface can be chemically etched if the core is made of quartz or a silica based glass.

When the core is a polymer, like in many practical embodiments of the instant invention, treatment of the exposed core with an appropriate solvent will render the exposed surface diffuse.

FIG. 2A shows a top view of the fiber whose cross section was shown in FIG. 1A, the cross section is at the indicated plane A. The light source (not shown) is far to the right and most of the light enters the fiber within the acceptance angle $\alpha_{co}$. On the cladding 3, between the points z=0 and z=L, we show the core exposed 5 for which the angle $\theta(z)$ increases in a hyperbolic manner as the distal end 7 at z=L is approached. FIG. 3A shows a side view of the same light extractor showing the hyperbolic form of the residual cladding 3 after the surface 5 of the core has been exposed and abraded.

In lieu of abrading the core itself, I can replace the cladding removed above the core spanned by the angle $\theta(z)$ or the segment 5 of FIGS. 1A, 2A and 3A with a substance having an index of refraction $n_3 > n_1$, and thus cause refraction of light into this segment of the replaced cladding. A cross section through a fiber of this configuration is shown in FIG. 1B, where the fiber 10 has a segment 15 of its core 12 exposed by removing a portion of its low index of refraction cladding 13 spanned by the angle $\theta(z)$. The portion of the cladding removed is now replaced with a high index of refraction cladding 16.

The variation of $\theta(z)$ with z obeys the same functional relationships described above for any given extraction rate desired. Light impinging on the segment 15 from within the core 12, will be refracted into the new cladding 16.

Figure 2B:
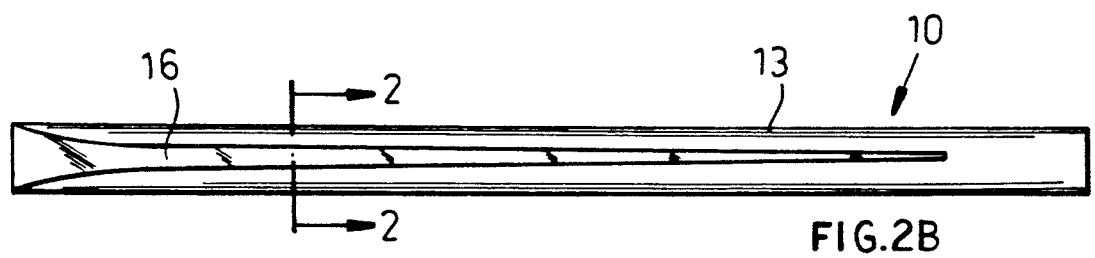
Figure 3B:
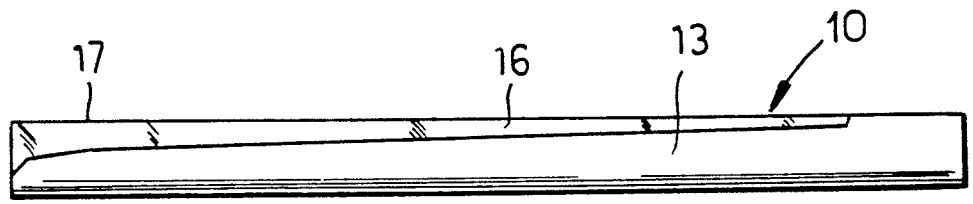

In FIG. 2B we show a top view of this embodiment with a plane A, the plane through which the cross section depicted in FIG. 1B is presented. In FIG. 3B a side view of the same light extractor is shown.

When using the embodiment presented in FIGS. 1B, 2B and 3B of the instant invention, the outer surfaces of both high and low refractive indices claddings, 17 and 18 respectively, are abraded. This to extract the light introduced from the core into the cladding at the interface 15 between the core and the high index of refraction cladding replacement, from the cladding. This is necessary since the critical angle of cladding (interfacing with air) will be larger than the critical angle of the core, and thus cladding modes need be extracted. The quantity of light emanating from the cladding, however, is still determined as before by the change with z of the angle $\theta$.

In the embodiment of in FIGS. 1B, 2B and 3B, light is extracted from the core by controlling the effective critical angle of the core along the extraction zone, essentially reducing this angle to zero for an increasing portion of the core circumference as the distal end of the extractor is approached.

Figure 2C:
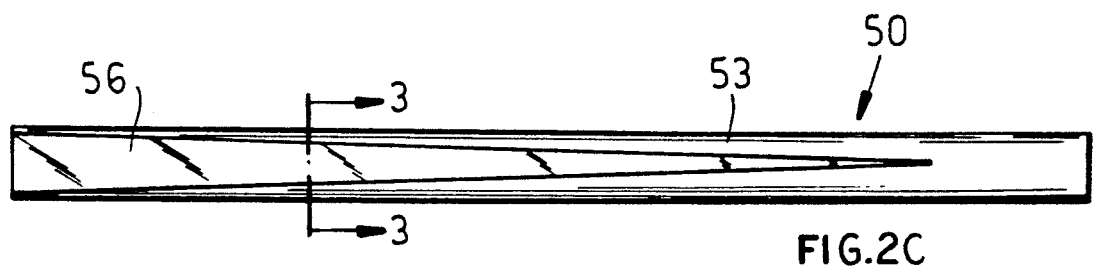
Figure 3C:
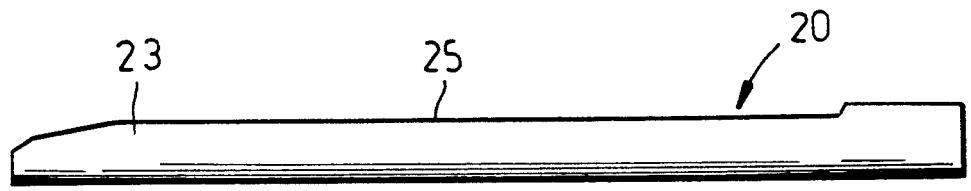
Figure 3D:
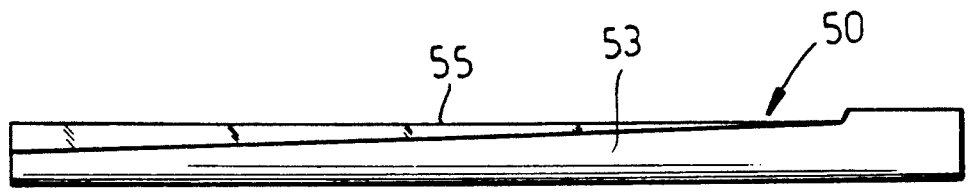

When the aspect ratio of the extraction zone is very large, namely the length of the zone is large relative to the diameter of the fiber, then the hyperbolic function determining the rate of extraction from the fiber can be approximated with a simple triangular decladding. In FIG. 2C I show a top view of such an embodiment, where in a light extractor 50 the cladding 53 has been removed, exposing a segment 55 of the core in a simple triangular shape, and as before, the outer surface of the exposed core 55 is abraded. The cross section through plane A of FIG. 2C would be the same as shown in FIG. 1A, except that the function $\theta(z)$ is now a linear function of z. The side view of the same embodiment is shown in FIG. 3D.

Figure 3E:
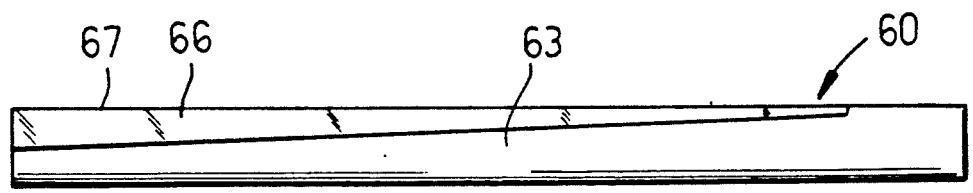

It should be clear that in this instance as above the portion of low index of refraction cladding removed can be replaced with a high index of refraction segment as seen in FIG. 3E, where an optical fiber 60 is shown in which part of the low index of refraction cladding 63 has been replaced with a high index of refraction cladding 66. As for the similar hyperbolic case described above, when using this higher index of refraction cladding, abrasion of the optical fiber total circumference is desired.

Instead of removing the cladding only, the surface of the fiber can be planed to remove both the cladding and a portion of the core as shown in FIG. 1C, which illustrates a cross section through a planed optical fiber 20 consisting of a core 22 and a cladding 23. A segment of the composite fiber is removed in such a fashion tha the angle $\theta(z)$ increases hyperbolically from $z=0$ to $z=L$ as shown in FIG. 3C. A cross section of this fiber corresponds to FIG. 1C, where the curved plane 25 spans a variable angle $\theta(z)$. The core 22 of the fiber in this side view is not visible.

Figure 3F:

In yet another embodiment of the instant invention, where the aspect ratio of the extraction zone is very large, I can simply remove a segment of the fiber and the core, by polishing the fiber at an angle to its axis, as shown in FIG. 3F (the cross section through the plane A of FIG. 3F is the same as that of FIG. 1C, except that the angle $\theta(z)$ is now a linear function of (z), where the optical fiber 70 has had a flat segment removed, leaving an abraded surface 75 of the core and some of the cladding.

The latter two embodiments of the instant invention are much easier to implement since they require only the simple abrasion of the fiber in either a curved plane or a flat plane inclined to the fiber axis. In some embodiments of the fibers described by the cross section given in FIG. 1C, the planed surface (which is roughened due to the planing process which involves abrasion) can be covered with an additional optional thin protective layer 26. It is preferred that the index of refraction of this layer be larger than the core index of refraction. The outer surface of this layer need not be abraded since light emerging from the core is diffused into a lambertian distribution at the abraded surface 25 of the core.

In the above embodiments, which we have termed refractive extraction, since most of the light is refracted from the abraded surface and emerges from that surface, secondary light extraction also occurs form the untreated surface due to the fact that not all the light impinging on the treated surface is refracted out but some light is reflected into the core to become leaky modes that emerge from the cladded zone of the fiber. The intensity of this secondary illumination is, however, much weaker than the primary light flux emerging directly from the treated core surface. As a result of this specific extraction mode choice, the fibers, when viewed directly, appear as bright triangular shapes, the projection of the treated surface.

When it is desired to have a more homogeneous glow in the extraction zone, I use the lambertian reflection extraction method of the instant invention. In this method, the light is lambertially reflected in all directions from the bottom par of the core back into the core (and the cladding).

Figures 1D, 1E:
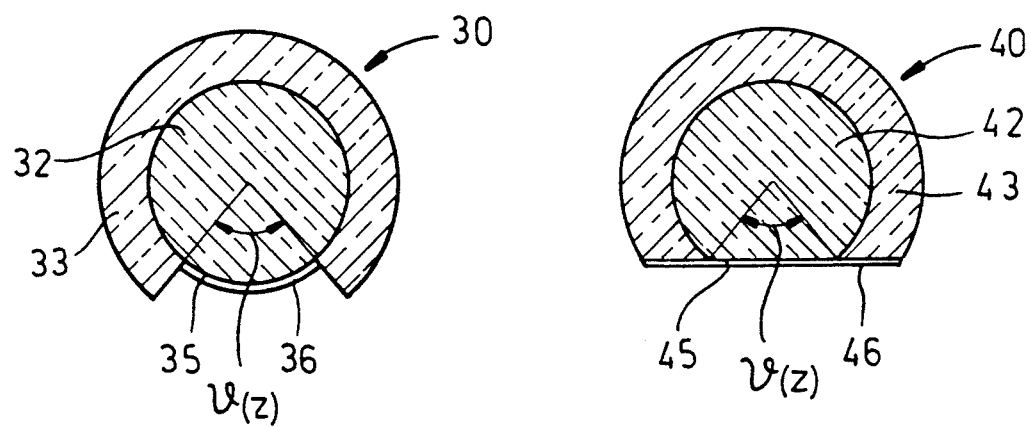

Because the reflector is a white highly reflective diffuse reflector, most of the light impinging on the reflector will be reflected back into angles larger than $\alpha_c$, and thus extracted from the fiber. The examples of cross sections through lambertian reflectors based extraction systems are given in FIGS. 1D and 1E. FIG. 1D shows a fiber 30 essentially as described in FIG. 1A, except that the cladding 33 is removed from the bottom surface (bottom, meaning opposite the zone where emanation of the light is desired) of the fiber and replaced with a material 36 which is a lambertian reflector. The determination of the decladding angle $\theta(z)$ spanning the exposed core surface 35 is exactly as described for the refractive extractor system above. The exposed core 35 should preferably be polished or smooth before applying the lambertian reflector 36, unlike the treatment applied to this segment of the core in reflective extractors discussed above. Attention should be given to assure minimization of air gaps between the exposed core 35 and the reflector 36. One can easily obtain the desired results when using for the reflector 36 a white paint like Spraylat Corp.'s Lacryl Series 20-02 matte white paint, or a self-adhering white film like 3M's Series V-5115 Scott TM films.

FIG. 1E shows the cross section of a fiber 40 of the instant invention where the decladding is achieved by removing both cladding 43 and the core 42 over an angle $\theta(z)$ (spanning the core) by cutting the fiber longitudinally so that the angle spanning the exposed core obeys the desired relationship derived from equations 6 and 7. The top and side views of lambertian reflective extraction systems can easily be derived form the Figures shown by an appropriate inversion.

FIG. 1E provides a representative cross section through the plane A of inversions of both FIGS. 3C and 3F which represent respectively a fiber in which the plane is curved to yield an exact solution for $\theta(z)$, or a flat plane which is easier to manufacture and proves an approximate solution for $\theta(z)$, as described earlier for similar refractive extraction systems. The flat plane reflective extraction system is particularly useful when the light extractors are mounted on a flat surface to illuminate an area opposing this surface homogeneously. In most cases, the index of refraction of the reflective surface is naturally higher than the index of refraction of the core, and this choice is the preferred embodiment for the lambertially reflective layers 36 and 46 of the instant invention.

In the event that this condition cannot be achieved, one can fuse the white reflector to the core. When the core is a polymer, this is achieved by moderately applying heat to the interface between the core and the reflector. When using highly refractory cores, like quartz, annealing at higher temperature is required. A good reflecting substance to be used in conjunction with refractory cores as the reflecting medium would be a combination of finely divided particles of titanium dioxide mixed in zirconium silicate.

While in the drawings claddings are illustrated that are relatively thick in relationship to the cores, it should be understood that this is done only for the purpose of illustration. In practice, the cladding of the fibers of the instant invention can be very thin, and in some instances even absent.

The purpose of the claddings in traditional optical fibers is to protect the core from external damage and also to absorb accidental cladding transmission modes (which cause dispersion in optical communication type fibers and cross talk between fibers). In fibers used as light extractors, it would be usually desirable to have a cladding with a minimal index of refraction, this to improve the acceptance angle of the fiber $\alpha_c$ (see equation 1) of the fiber. Air has an index of refraction $n_0 \times 1$ and would therefore be optimal. A cladding is highly recommended in that portion of the fiber where light is transmitted only, this to avoid accidental extraction of light prior to reaching the extraction zone by damaging the core during handling and installation. A thin cladding for the same purpose is useful in the cladded zone of the extraction fiber, but is not really necessary, since small surface imperfection will not drastically impact the performance of the extraction zone.

In the practice of the instant invention, one usually uses relatively thick optical fibers having a diameter of a few millimeters. This facilitates the treatment of the surface to obtain the correct decladding geometry.

While I have described embodiments of this invention using cladded optical fibers, it should be understood that other optical waveguides having planar geometry can be used as well. The parameter $\theta(z)$ used in the above description would then be replaced by a new parameter $T(z)$ which describes the ratio of the exposed core to the unexposed periphery of the core. Equations (7) and (8) controlling the relationship between the exposed zone and the total periphery need be modified somewhat to account for the fact that in planar waveguides the proportion of helically propagating modes is much smaller than in circular waveguides, and thus $I_z$ is no longer distributed equally around the periphery, but mostly in the core segment not yet exposed and abraded.

FIG. 1B shows an optical fiber of the instant invention in which a portion of the low refractive index cladding 13 has been replaced by a high refractive index cladding 16 in order to bring the critical angle of the core at the surface 15 to zero, and thus refract out of the fiber an amount of light from the fiber in proportion to the angle $\theta(z)$. In another embodiment of the instant invention, we keep the decladded zone constant as a function of z, namely we use $\theta$=Const. However, I modify the index of refraction of the clading insert 16 using a graded index material in which the index of refraction changes from $n_2$, the fibers' cladding original index of refraction of the proximal end of the extraction zone (z=0) to a value $n_1$ (or somewhat larger) at the distal end (z=L) of the extraction zone, where $n_1$ is the index of refraction of the core of the fiber.

The gradual change in the index of refraction causes a corresponding gradual decrease in the fiber's critical angle, until it reaches zero. Therefore, all transmitted core modes have been converted to cladding insert (see 16 in FIG. 1B) modes, which themselves are extracted at the cladding roughened outer surface 17.

In using this approach, one can replace the changing span $\theta$ calculated from equations (7) and (8) with an appropriate rate of change of $\alpha_c(Z)$, using equation (2) and the angular distribution of the light traveling in the core.

Figure 2D:
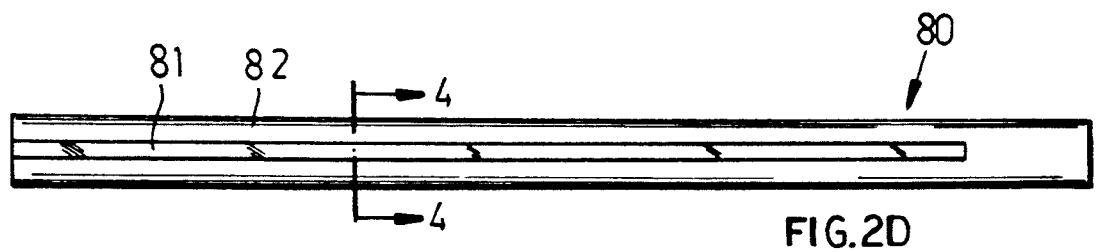

FIG. 2D shows the top view of this embodiment and as can be seen, the light extractor 80 has a fixed geometry zone 81 embedded in the original cladding 82. The index of refraction of the cladding insert 82 increases gradually from $n_2$ to $n_1$ along the extraction zone, the increase being in the direction of light propagation, namely, from the right to the left.

This approach does not usually yield very homogeneous illumination with a different light source, and thus not very good results because of the variations of angular distribution of light emitted between most light sources. However, when using light emitting diodes or lasers for which this distribution is usually constant and well known, this approach is very satisfactory. The advantage of the graded index of refraction method, is in that the geometry of the decladding is much easier to implement. Furthermore, it is not necessary to use a segment of the periphery of the fiber, but one could use the total fiber outer surface as the radiating source by simply applying on a core a graded index of refraction cladding according to the principles taught herein.

Figure 2E:
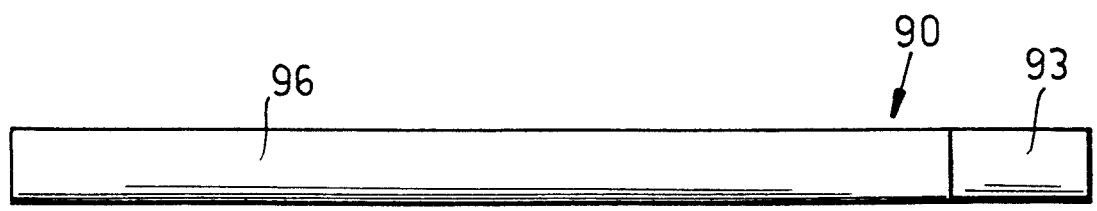

The top view of such an embodiment is shown in FIG. 2E. Here a light extraction element 90 has an extraction zone 96 simply consisting of a graded index of refraction cladidng covering the total circumference of the core (not shown) replacing the original cladding 93 having an index of refraction $n_2$, in the extraction zone. The index of refraction $n_E$ of the new cladding 96 varies from $n_E = n_2$ at the proximal end of the extraction zone to $n_E = n_1 + \delta$ at the distal end of the extraction zone, where $n_1$ is the index of refraction of the core and $\delta$ is a small nonvanishing increment.

As above, the function $n_E(z)$ is chosen to obtain the desired extraction rate as a function of z along the extraction zone. In this case I obtain light distribution which is symmetric aroudn the fiber, unlike the embodiments discussed above in which the fixed index of refraction claddings are used in conjunction with decladding a variable segment of the fiber (suing either diffuse refraction or lambertian reflection), defining in essence, a bloom and a top segment of the fiber's extraction zone, and where most of the light extracted emanates from the top portion of the extraction zone.

It should be obvious to those skilled in the art that in practicing this invention, and designing extraction system with available intensity along the extraction zone, it is preferred to position the zones of higher luminosity closer to the proximal end and the zones of lower luminosity near the distal end of the extraction zone, when the direction of light propagation is from the proximal to the distal end.

Additional variations of the principles taught in this specification will be self evident to those skilled in the art. For instance, if an embodiment is desired in which better circumferential light is obtained, one could use numerous circumferentially arranged decladded zones, and adjust through equations (7) and (8) the proper rate of change of each decladding angle with the position z in the extraction zone. This approach would be particularly useful with refractive type extraction system. When using this approach the lambertian reflectors, the side of the reflector viewed from the outside appears as a dark element.

Another simple variation involves an extraction system where it is desired to retain some of the transmitted light to be emitted at the distal end of the light extractor. This would be achieved by solving equations (7) and (8) with the additional boundary condition for $I_z$, $I_L = \gamma I_O$, where $\gamma$ is the fraction of the input light intensity $I_O$ desired to be emitted at the distal end of the light extraction system.

I claim:

1. A method of illuminating an area, comprising the steps of:
   (a) providing at least one elongated light waveguide having a periphery so structured with respect to a core thereof as to enable said core to transmit light along the waveguide while said periphery prevents substantial emanation of light from said core in a direction transverse to said waveguide;
   (b) modifying a portion of said periphery over an extraction zone L of said waveguide to impart a generally triangular shape to said zone extending continuously from a narrow end to a wide end thereof and so that light travelling through said core in a propagation direction from said narrow end to said wide end will emanate in an emanation direction transversely to said propagation direction, said zone narrowing in width in a spreading direction transversely to said propagation direction and to said emanation direction whereby an area exposed to said light emanating from said waveguide is illuminated continuously along said length of said zone; and
   (c) injecting light into said waveguide ahead of said narrow end so that the light propagates in said propagation direction whereby said area is illuminated.

2. The method defined in claim 1 whereby said waveguide is an optical fiber and said core is cylindrical, said zone having a width in said spreading direction defined by an angle $\theta(z)$ whereby z is distance along said zone as measured in said propagation direction, said angle $\theta(z)$ substantially satisfying the relationship $$\theta(z) = \frac{J(z)}{K - C \int_0^z J(z)dz}$$

where $J(z)$ is a desired light extraction rate per unit length of the extraction zone L, K and C being constants.

3. The method defined in claim 2 wherein said periphery is formed by a cladding of said optical fiber and said cladding has an index of refraction which is less than an index of refraction of said core.

4. The method defined in claim 3 wherein said periphery is modified in step (b) by removing said cladding over said zone.

5. The method defined in claim 4, further comprising the step of rendering a surface of said core which is exposed over said zone diffusively light emissive.

6. The method defined in claim 5 wherein said surface is rendered diffusively light emissive by abrading said surface.

7. The method defined in claim 5 wherein said surface is rendered diffusively light emissive by coating said surface.

8. The method defined in claim 5 wherein said surface is rendered diffusively light emissive by chemically treating said surface.

9. The method defined in claim 3 wherein said periphery is modified in step (b) by substituting for said cladding in said zone, a cladding of refractive index which is greater than an index of refraction of said core and has a diffusively light emissive outer surface.

10. The method defined in claim 3 wherein said periphery is modified in step (b) by applying a diffusively reflective coating to said core along but generally opposite said zone, thereby directing light through said core from said reflective coating in said emanation direction.

11. A device for illuminating an area which comprises:
   at least one elongated light waveguide extending in juxtaposition with said area and having a periphery so structured with respect to a core thereof as to enable said core to transmit light along the length of the waveguide while said periphery prevents emanation of light from said core in a direction transverse to said waveguide, a portion of said periphery over an extraction zone of a length L of said waveguide imparting a generally triangular shape to said zone extending continuously from a narrow end to a wide end thereof and so that light travelling through said core in a propagation direction from said narrow end to said wide end will emanate in an emanation direction transversely to said propagation direction, said zone varying in width in a spreading direction transversely to said propagation direction and to said emanation direction whereby an area exposed to light emanating from said waveguide is illuminated continuously along said length; and means for injecting light into said waveguide ahead of said narrow end so that the light propagates in said propagation direction.

12. The device defined in claim 11 whereby said waveguide is an optical fiber and said core is cylindrical, said zone having a width in said spreading direction subtended by an angle $\theta(z)$ whereby z is distance along said zone as measured in said propagation direction, said angle $\theta(z)$ substantially satisfying the relationship $$\theta(z) = \frac{J(z)}{K - C \int_0^z J(z)dz}$$

where J(z) is a desired light extraction rate per unit of length of said extraction zone, K and C being constants.

13. The device defined in claim 12 wherein said periphery is formed by a cladding of said optical fiber and said cladding has an index of refraction which is less than an index of refraction of said core.

14. The device defined in claim 13 wherein said cladding is omitted along said zone.

15. The device defined in claim 13 wherein said zone is provided with a cladding with an index of refraction greater than an index of refraction of said core.

16. The device defined in claim 13 wherein said zone is provided with a reflecting coating directing light through said core so that said light emanates from said core at a side thereof opposite that at which said reflective coating is provided.

17. The device defined in claim 12 wherein a plurality of said fibers is provided in a parallel array.

18. A method of illuminating an area, comprising the steps of:
(a) providing at least one elongated light waveguide having a periphery so structured with respect to a core thereof as to enable said core to transmit light along the waveguide while said periphery prevents substantial emanation of light from said core in a direction transverse to said waveguide;
(b) modifying a portion of said periphery over a continuous elongate zone of said waveguide having a shape and a width or refractive index selected so that light travelling through said core in a propagation direction along the length of said zone will emanate in an emanation direction transversely to said propagation direction in an intensity dependent upon the shape, width or refractive index to illuminate an area exposed to said light emanating from said waveguide continuously along said length of said zone at a predetermined rate; and
(c) injecting light into said waveguide ahead of said narrow end so that the light propagates in said propagation direction whereby said area is illuminated.

19. A device for illuminating an area which comprises:
at least one elongated light waveguide extending in juxtaposition with said area and having a periphery so structured with respect to a core thereof as to enable said core to transmit light along the length of the waveguide while said periphery prevents emanation of light from said core in a direction transverse to said waveguide, a portion of said periphery over an elongate continuous extraction zone of said waveguide imparting a selected shape, width and refractive index to said zone so that light travelling through said core in a propagation direction along a length of the zone will emanate in an emanation direction transversely to said propagation direction, said zone having a shape, width and refractive index selected to illuminate an area exposed to light emanating from said waveguide at a predetermined rate per unit length of the zone; and
means for injecting light into said waveguide ahead of said narrow end so that the light propagates in said propagation direction.

20. A method of illuminating an area, comprising the steps of:
(a) providing at least one elongated light waveguide having a periphery so structured with respect to a core thereof as to enable said core to transmit light along the waveugide while said periphery prevents substantial emanation of light from said core in a direction transverse to said waveguide;
(b) varying a refractive index of a portion of said periphery over a fixed continuous elongate zone so that the refractive index of said portion is less than that of said core and that light travelling through said core in a propagation direction along the length of said zone will emanate in an emanation direction transversely to said propagation direction in an intensity dependent upon the variation in the refractive index to illuminate an area exposed to said light emanating from said waveguide continuously along said length of said zone at a predetermined rate; and
(c) injecting light into said waveguide ahead of said narrow end so that the light propagates in said propagation direction whereby said area is illuminated.

* * * * *